United States Patent [19]

Obayashi et al.

[11] 4,067,233
[45] Jan. 10, 1978

[54] INTAKE AIR AMOUNT MEASURING SYSTEM FOR AN INTERNAL COMBUSTION ENGINE

[75] Inventors: Hideki Obayashi, Aichi; Tokio Kohama, Nishio; Hisasi Kawai, Toyohashi; Tsuneyuki Egami, Okazaki, all of Japan

[73] Assignee: Nippon Soken, Inc., Nishio, Japan

[21] Appl. No.: 776,292

[22] Filed: Mar. 10, 1977

[30] Foreign Application Priority Data

May 2, 1976 Japan .................................. 51-50556

[51] Int. Cl.$^2$ ............................................. G01M 15/00
[52] U.S. Cl. ....................... 73/116; 73/204; 123/32EA
[58] Field of Search ............. 73/116, 204; 123/32 EA

[56] References Cited

U.S. PATENT DOCUMENTS

| 1,260,498 | 3/1918 | Wilson | 73/204 |
| 2,994,222 | 8/1961 | Laub | 73/204 |
| 3,747,577 | 7/1973 | Mauch et al. | 123/32 EA |
| 3,824,966 | 7/1974 | Schneider et al. | 123/32 EA |

Primary Examiner—Jerry W. Myracle
Attorney, Agent, or Firm—Cushman, Darby & Cushman

[57] ABSTRACT

A thermally-sensitive resistor is positioned in each of two separate passages provided in the intake pipe of an internal combustion engine, and an electric heater is positioned upstream of one of the thermally-sensitive resistors with respect to the direction of flow of intake air. The thermally-sensitive resistors form, along with two reference resistors, a bridge circuit which converts the difference between the resistances of the thermally-sensitive resistors caused by the electric heater, i.e., the difference between the temperatures in the passages to a voltage difference. A control circuit controls the voltage across the electric heater in such a manner that the said voltage difference is maintained constant and thus the amount by weight of intake air can be directly obtained. The input voltages to the thermally-sensitive resistors are applied in the form of pulses through an oscillator circuit thereby reducing the problem of drift of the bridge circuit.

7 Claims, 5 Drawing Figures

INTAKE AIR AMOUNT MEASURING SYSTEM FOR AN INTERNAL COMBUSTION ENGINE

BACKGROUND OF THE INVENTION

1. Field of the Invention

The present invention relates to intake air amount measuring systems for internal combustion engines, and more particularly the invention is related to a system for measuring the amount of intake air flow to internal combustion engines of the type incorporating an electronically controlled fuel metering system.

2. Description of the Prior Art

Controlling the air-fuel ratio of mixtures supplied to an internal combustion engine at a predetermined ratio is a very effective means of purifying the exhaust gases discharged from the engine. For this purpose, it is necessary to accurately measure the amount of intake air flow to the engine and supply fuel to the engine in an amount corresponding to the intake air amount. A known measuring system of this type employs the method of indirectly measuring the amount by volume of intake air in accordance with the engine rotational speed and intake vacuum or the engine rotational speed and throttle valve opening angle.

While the measuring system employing the above-mentioned measuring method has some advantages, there is also a disadvantage that since the amount of air drawn from the intake pipe is measured indirectly, the error in measurement tends to become large due to the effects of variations among engines caused during the manufacturing process, deterioration of engine, intake and exhaust valve clearances, deterioration of air cleaner with time, etc. Another disadvantage of this method is that since the amount of intake air is measured in terms of volumetric flow rate, conversion into absolute pressure must be effected thus making the system more complicate and expensive. Another prior art system such as disclosed in U.S. Pat. No. 3,975,951 has been proposed to overcome the foregoing difficulty. More specifically, the system is so constructed that a branch having two passages is disposed in the intake pipe of an engine, and first and second thermally-sensitive resistors are disposed in the passages in such a manner that a bridge circuit is formed by the thermally-sensitive resistors together with two separately provided reference dividing resistors. An electric heater is positioned upstream of the first thermally-sensitive resistor disposed in one of the passages in the branch, so that the heat generated by the electric heater will produce a temperature difference between the passages in the branch. This temperature difference causes a resistance differrence corresponding to the temperature difference between the first and second thermally-sensitive resistors. Thus, by controlling the voltage applied to the electric heater or the amount of heat generated by the electric heater in such a manner that a voltage difference caused by the resistance difference is always maintained constant, that is, the temperature difference between the first and second thermally-sensitive resistors is always maintained constant, it is possible to cause the said voltage to assume a value corresponding to the amount of intake air. While the inventors have made this prior art system in which the amount of intake air flowing in the intake pipe is directly measured in terms of weight flow, this intake air amount measuring system is disadvantageous in that if the electric heater is electrically connected in parallel with the bridge circuit and the generation of heat by the electric heater is controlled to maintain the temperature difference between the two passages in the branch constant, that is, if the same d.c. voltage is applied to the electric heater and to the bridge curcuit whose output is amplified by a known type of d.c. differential amplifier, and the amount of heat generated by the electric heater is controlled through the voltage applied to the electric heater, a drift is caused in the bridge circuit by the fact that current is always flowing in the bridge circuit. Another problem with this prior art system is that since the amplifier is a direct-coupled amplifier, a temperature drift is caused in the amplifier thus making it impossible to accurately measure the amount of intake air. Generally, while, in realizing a low drift circuit, it has been the practice to use expensive low drift elements as a measure to reduce the drift, this inevitably tends to increase the manufacturing cost as compared with a circuit employing general-purpose elements.

SUMMARY OF THE INVENTION

With a view to overcoming the foregoing deficiencies, it is an object of the invention to provide an improved intake air amount measuring system which is capable of measuring the amount of intake air with greater accuracy by reducing the drift of an amplifier and a bridge circuit.

In accomplishing the above and other objects, the improved intake air amount measuring system provided in accordance with the invention is so designed that an oscillator circuit is provided before a bridge circuit including first and second thermally-sensitive resistors disposed in a branch pipe and two reference dividing resistors connected in parallel with the thermally-sensitive resistors, and the d.c. voltage applied to an electric heater is also applied to the oscillator circuit whereby the d.c. voltage is converted to an a.c. voltage and applied to the bridge circuit and the bridge output is a.c. amplified.

The above and other objects and features of the invention will be apparent from the following description taken in conjunction with the accompanying drawings.

DESCRIPTION OF THE PREFERRED EMBODIMENT

Figure 1:
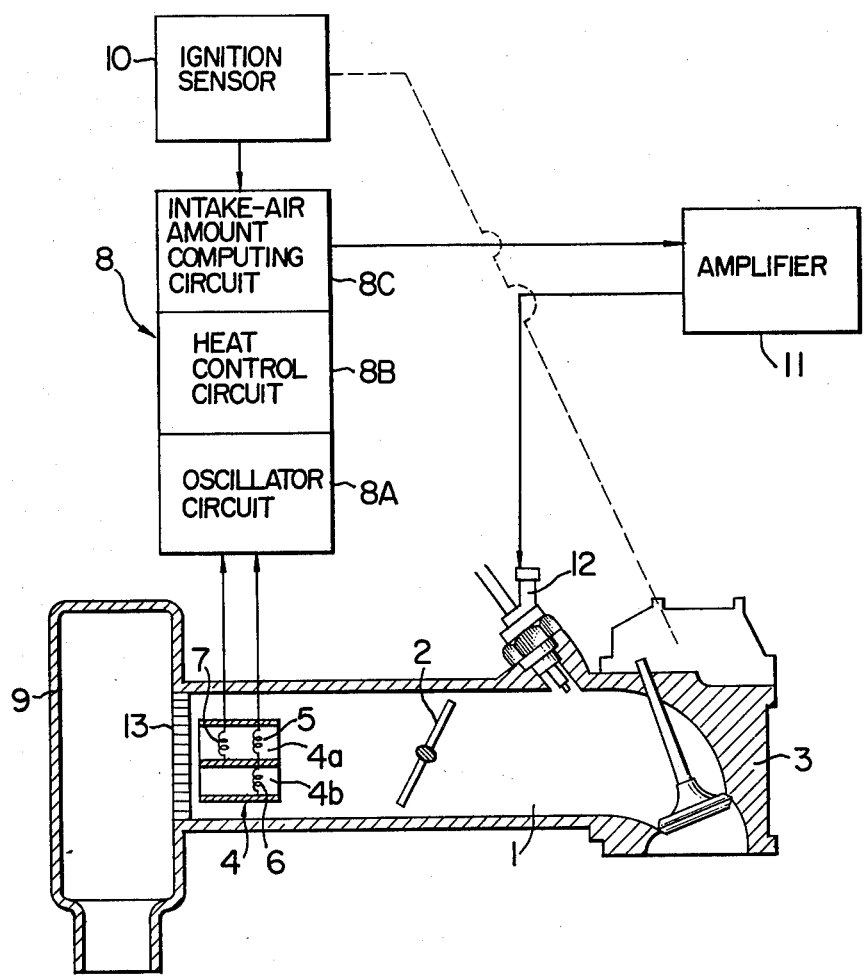
FIG. 1 is a schematic diagram showing the entire construction of an embodiment of the invention.

Referring first to FIG. 1, numeral 1 designates the intake pipe of an internal combustion engine 3, 2 a throttle valve mounted in the intake pipe 1, 4 a branch pipe disposed within the intake pipe 1, the branch pipe including two air passages 4a and 4b and made from a heat insulating material such as glass wool. An electric heater 7 is disposed in the upstream position of the air passage 4a, and a first thermally-sensitive resistor 5 which serves as a thermometer is disposed adjacent to and downstream of the electric heater 7 in the air passage 4a. Disposed in the air passage 4b is a second thermally-sensitive resistor 6 which serves as a thermometer. The thermally-sensitive resistors 5 and 6 having the same characteristics are each made, in this embodiment, of a platinum resistance wire having a positive resistance-temperature coefficient characteristic as is the case with the electric heater 7. Numeral 13 designates a flow rectifying device formed into a honeycomb-like shape. Numeral 9 designates a disturbance preventing unit by which the intake air flow passing through the flow rectifying device 13 is prevented from being disturbed under the effect of external air, 8 a control unit comprising an oscillator circuit 8A which serves the function of convering the same d.c. voltage as applied to the electric heater 7 into an a.c. voltage and applying it to a bridge circuit including the thermally-sensitive resistors 5 and 6 and two reference dividing resistors, a heat control circuit 8B for controlling the amount of heat generated by the electric heater 7, and an intake air amount computing circuit for computing the amount of heat generated by the electric heater 7, computing the weight flow of intake air from the computed heat value and controlling the time of fuel injection to the engine 3. Numeral 10 designates a known type of ignition sensor for producing a pulse output in synchronism with the revolution of the engine 3, 11 an amplifier for amplifying the output signal of the control unit 8. Numeral 12 designates an electromagnetically-operated fuel injection valve mounted in the intake pipe 1 and adapted to be opened by the signal from the amplifier 11 to supply fuel to the engine 3.

Figure 2:
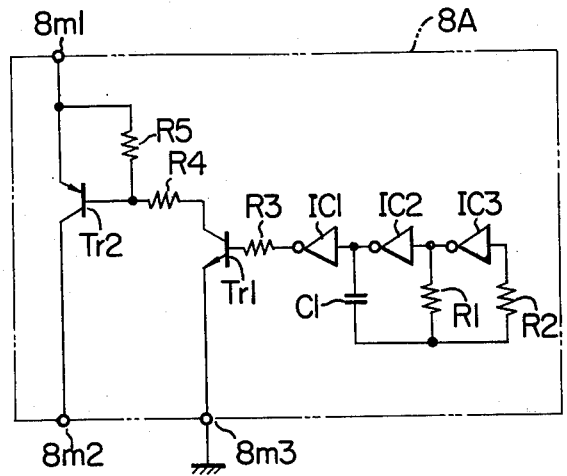
FIG. 2 is a circuit diagram showing a detailed construction of the oscillator circuit shown in FIG. 1.
Figure 3:
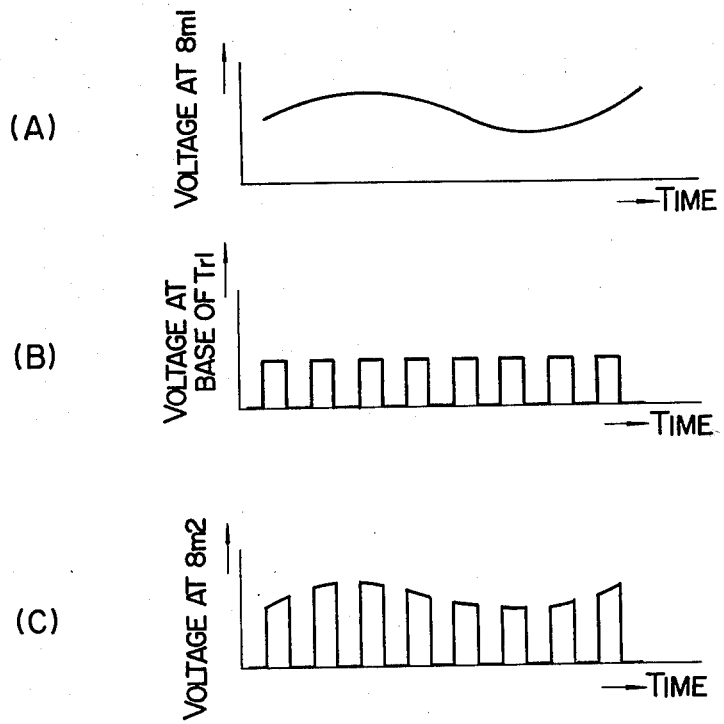
FIG. 3 shows the signal waveforms generated at various points in the oscillator circuit shown in FIG. 2.

As shown in FIG. 2, the oscillator circuit 8A is so designed that C-MOS integrated circuit inverters IC2 and IC3, a capacitor C1 and resistors R1 and R2 which constitute an oscillator produce an oscillation signal, and this oscillation signal is then reshaped by an inverter IC1 and applied to the base terminal of a transistor $Tr1$ through a resistor R3. When the transistor $Tr1$, grounded at a terminal 8m3, is turned on, current flows through resistors R4 and R5 from a terminal 8m1 and a transistor $Tr2$ is turned on. Consequently, the voltage applied to the terminal 8m1 is delivered to an output terminal 8m2 as an on-off signal having a frequency corresponding to the oscillation signal. The signal waveforms produced respectively at the input terminal 8m1, the base of the transistor $Tr1$ and the output terminal 8m2 are shown in (A), (B) and (C) of FIG. 3, respectively.

Figure 4:
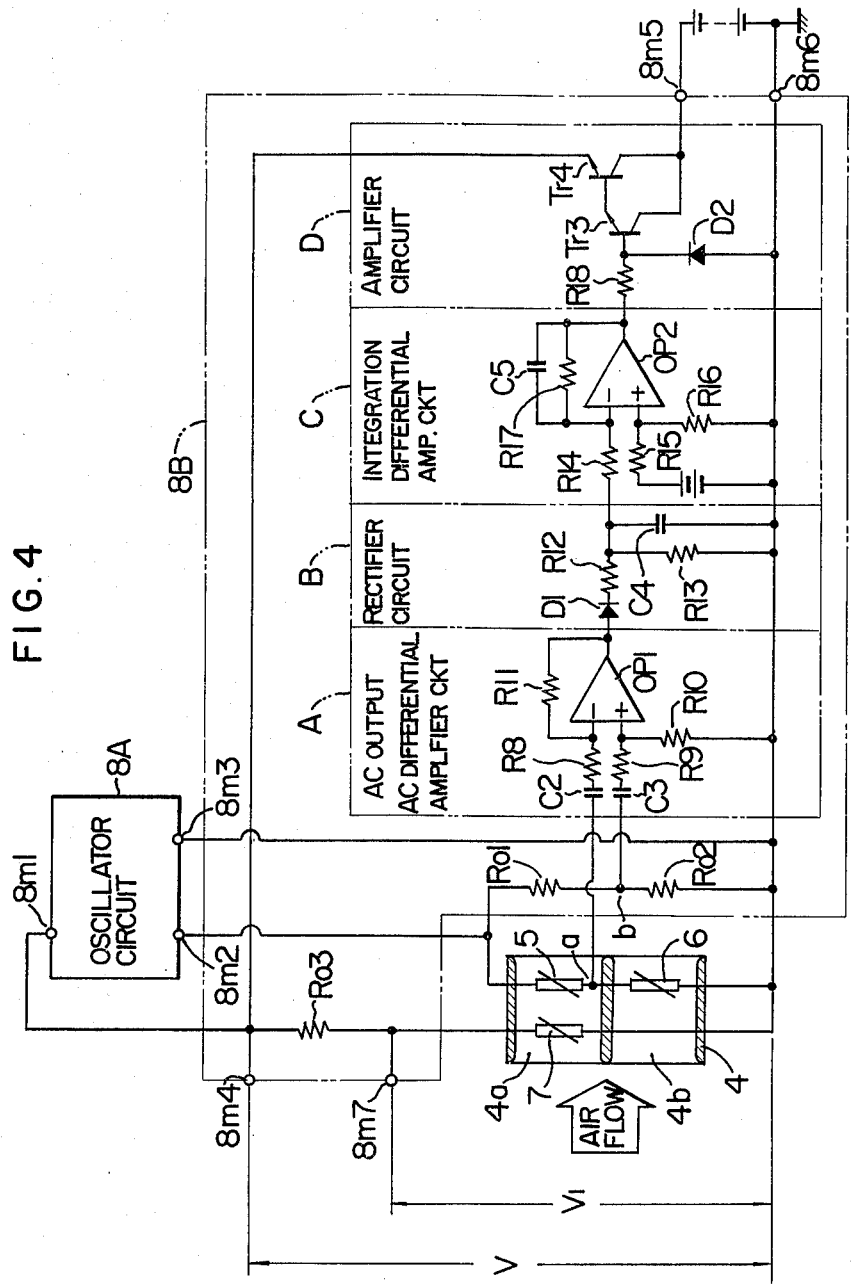
FIG. 4 is a circuit diagram showing a detailed construction of the a.c. amplification heat control circuit shown in FIG. 1.

As shown in FIG. 4, the heat control circuit 8B comprises differential amplifiers, and a d.c. voltage V is applied to the input terminal 8m1 of the oscillator circuit 8A and the electric heater 7 through a resistor R03. The d.c. voltage applied to the oscillator circuit 8A is delivered as the on-off output signal shown in (C) of FIG. 3 and applied through the terminal 8m2 to the bridge circuit comprising reference dividing resistors R01 and R02 and the thermally-sensitive resistors 5 and 6. In the Figure, symbol A designates an a.c. output differential amplifier circuit comprising input capacitors C2 and C3, input resistors R8 and R9, a resistor R10, a feedback resistor R11 and an operational amplifier OP1 and adapted to amplify the potential difference between a junction point $a$ of the thermally-sensitive resistors 5 and 6 and a junction point $b$ of the reference dividing resistors R01 and R02. Symbol B designates a rectifier circuit comprising a diode D1, resistors R12 and R13 and a capacitor C4 and adapted to half-wave rectify and convert the a.c. output of the a.c. output differential amplifier circuit A into a d.c. voltage. Symbol C designates an integration differential amplifier circuit comprising input resistors R14 and R15, a resistor R16, a feedback resistor R17, an integrating capacitor C5 and an operational amplifier OP2 and adapted to integrate and differentially amplify the difference between the output voltage of the rectifier circuit B and a reference voltage. Symbol D designates an amplifier circuit comprising a resistor R18, a diode D2 and transistors $Tr3$ and $Tr4$ and adapted to amplify and apply the output voltage of the integration circuit C to the electric heater 7 and the oscillator circuit 8A. Numerals 8m4 and 8m7 designate the output terminals of the heat control circuit 8B, 8m5 and 8m6 terminals connected to a d.c. power source.

Figure 5:
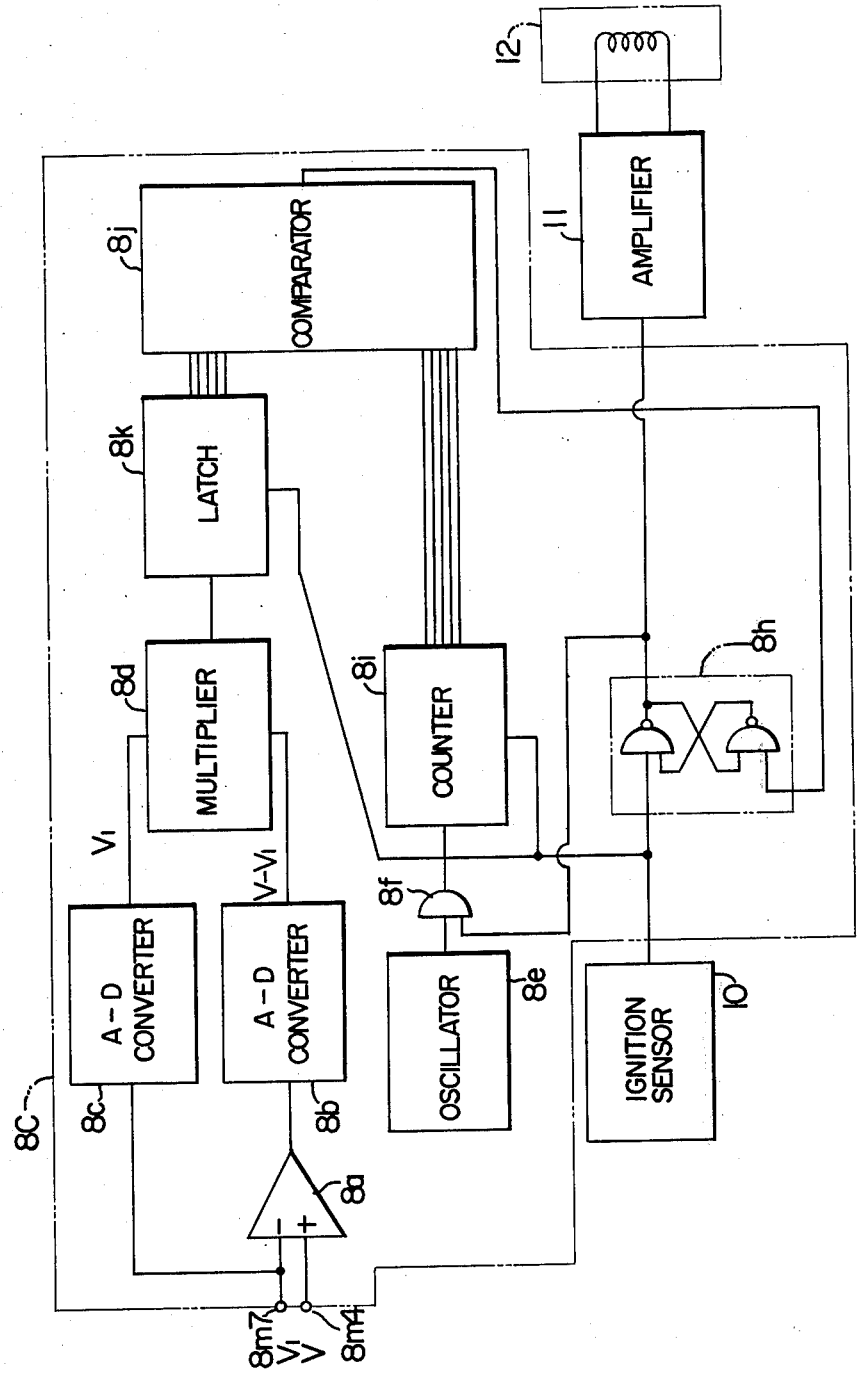
FIG. 5 is a block diagram showing a detailed construction of the intake air amount computing circuit shown in FIG. 1.

The construction of the intake air amount computing circuit 8C is shown in FIG. 5, in which numerals 8m4 and 8m7 designate the input terminals of the computing circuit 8C, of which the one input terminal 8m4 is connected to the one output terminal 8m4 of the heat control circuit 8B and the other input terminal 8m7 is connected to the other output terminal 8m7 of the heat control circuit 8B. Numeral 8a designates a known type of differential amplifier whereby the voltage V applied to the resistor R03 of the heat control circuit 8B and the electric heater 7 and a voltage V1 applied across the terminals of the electric heater 7 are compared and amplified to produce an output indicative of the difference therebetween, 8b a known type of A-D converter for subjecting the output of the differential amplifier 8a to A-D conversion. Numeral 8c designates a known type of A-D converter whereby the voltage V1 applied across the electric heater 7 is subjected to A-D conversion. Numeral 8d designates a known type of nultiplier circuit for computing the amount of intake air from the output signals of the A-D converters 8b and 8c. In other words, assuming that $\Delta T$ represents the temperature difference detected by the thermally-sensitive resistors 5 and 6, Q the amount of heat generated by the electric heater 7, G the weight flow rate of intake air, V1 the voltage applied to the electric heater 7, V the voltage applied to the electric heater 7 and the resistor R03, R the resistance value of the resistor R03, $\phi$ the constant-pressure specific heat of air, and I the current flowing in the electric heater 7, then we obtain $$Q = 0.24 \times V1 \cdot I = 0.24 \times V1 \times \frac{(V - V1)}{R} = G \cdot \phi \cdot \Delta T$$

Thus, $$V1 \cdot (V - V1) = \frac{G \cdot \phi \cdot \Delta T \cdot R}{0.24}$$

Since the resistance value R is fixed and the constant pressure specific heat $\phi$ of air is also practically constant, if the amount of heat generation is controlled by the heat control circuit 8B to maintain the temperature difference $\Delta T$ constant, then the valve of $$\frac{\phi \cdot \Delta T \cdot R}{0.24}$$

is also maintained constant. Thus, by substituting K (proportionality constant) for $$\frac{\phi \cdot \Delta T \cdot R}{0.24},$$

then we obtain $$V1 \cdot (V-V1) = K \cdot G$$

Since the weight flow rate of intake air G is given by $V1 \cdot (V-V1)/K$, the weight flow rate of intake air can be computed from the result of the multiplication $V1 \cdot (V-V1)$ performed by the multiplier circuit $8d$.

Numeral $8e$ designates an oscillator, $8f$ an AND gate, $8h$ a flip-flop, $8i$ a known type of counter for counting the pulse signals from the oscillator $8e$, $8k$ a known type of memory latch for storing the signal from the multiplier circuit $8d$ in synchronism with the signal from the ignition sensor 10. Numeral $8j$ designates a known type of comparator for comparing the stored signal of the memory latch $8k$ and the output signal of the counter $8i$ to produce an output signal at its output terminal when the two signals are equal in value.

With the construction described above, the system of this invention operates as follows. In FIG. 1, an amount of air whose value is dependent on the opening angle of the throttle valve 2 is taken in from the disturbance preventing unit 9 and the air is then drawn into the engine 3 through the intake pipe 1. In this case, the air drawn into the intake pipe 1 is rectified by the flow rectifying device 13 formed into a honeycomb-like shape, so that a predetermined proportion of the total intake air is always introduced into the branch pipe 4 with the two passages. In the passage $4a$ of the branch pipe 4, the air flowing therethrough undergoes a certain temperature rise $\Delta T$ and it is then drawn into the engine 3 through the thermally-sensitive resistor 5. The air drawn into the passage $4b$ is further drawn into the engine 3 throuth the thermally-sensitive resistor 6. As a result, between the thermally-sensitive resistors 5 and 6 is produced a resistance difference which corresponds to the temperature difference $\Delta T$ caused by the electric heater 7 and related to the amount of intake air. Thus, the voltage applied to the electric heater 7 and the oscillator circuit 8A or the heat generation of the electric heater is controlled by the heat control circuit 8B to maintain the temperature difference $\Delta T$ between the two passages constant. For example, when the amount of intake air is increased, the temperature difference $\Delta T$ is decreased to decrease the potential difference between the junction point $a$ of the thermally-sensitive resistors 5 and 6 and the junction point $b$ of the reference resistors R01 and R02 in the bridge circuit. Thus, the output peak value of the a.c. output differential amplifier circuit A is decreased so that the rectified output signal of the rectifier circuit B is decreased to increase the difference between the rectifier output signal and the reference voltage, and the output of the integration differential amplifier circuit C is increased, thus increasing the voltage V applied to the electric heater 7 and the input terminal $8m1$ of the oscillator circuit 8A. When this occurs, the heat generation of the electric heater 7 is increased and the temperature difference $\Delta T$ between the passages is also increased.

On the contrary, when the amount of intake air is decreased, the temperature difference $\Delta T$ is increased and the potential difference between the junction points $a$ and $b$ in the bridge circuit is increased. Consequently, the output peak value of the a.c. output differential amplifier circuit A is increased and the putout voltage of the rectifier circuit B is also increased and applied to the integration differential amplifier circuit C. Thus, the potential difference between the output voltage of the rectifier circuit B and the reference voltage is decreased and the output of the integration differential amplifier circuit C is also decreased, thus decreasing the voltage V applied to the electric heater 7 and the input terminal $8m1$ of the oscillator circuit 8A through the amplifier circuit D. As a result, the heat generation of the electric heater 7 is decreased and the temperature difference $\Delta T$ between the passages $4a$ and $4b$ is decreased. As mentioned above, the heat control circuit 8B controls the d.c. voltage V applied to the electric heater 7 and the oscillator circuit 8A to cause the electric heater 7 to generate heat in accordance with the amount of intake air and thereby always maintain the temperature difference $\Delta T$ between the thermally-sensitive resistors 5 and 6 constant.

Next, the computing circuit 8C operates as follows. When the engine 3 is idling, the amount of intake air is small. Consequently, the d.c. voltage V applied from the heat control circuit 8B to the electric heater 7 and the oscillator circuit 8A or the voltage V applied to the electric heater 7 and the resistor RO3 and the d.c. voltage V1 applied to the electric heater 7 are both low, so that the output (V-V1) of the differential amplifier $8a$ is also small and the A-D converted output (V-V1) of the A-D converter $8b$ is also small, thus decreasing the output of the multiplier circuit $8d$ which performs multiplication of the output (V-V1) and the output V1 of the A-D converter $8c$. On the other hand, during the intermediate and high operation of the engine 3, the amount of intake air is increased, so that the heat control circuit 8B increases the output (V-V1) of the A-D converter $8b$ and hence the output V1·(V-V1) of the multiplier circuit $8d$.

In other words, the multiplier circuit $8d$ produces a signal proportional to the amount of intake air, and this signal is stored in the memory latch $8k$ in synchronism with the signal from the ignition sensor 10. On the other hand, in response to the trigger signal produced from the ignition sensor 10 in synchronism with the engine revolution, the flip-flop $8h$ is set so that the resulting flip-flop output signal is applied through the amplifier 11 to the fuel injection valve 12 thus causing it to open, and at the same time the AND gate $8f$ is opened by the output signal of the flip-flop $8h$ and the counter $8i$ starts counting the clock pulses produced from the oscillator $8e$. When the value the signal stored in the memory latch $8k$ becomes equal to the value of the output signal of the counter $8i$, the comparator $8j$ produces an output signal so that the flip-flop $8h$ is reset causing the fuel injection valve 12 to close, and the AND gate $8f$ is also closed. When the next trigger signal is produced from the ignition sensor 10, the counter $8i$ and the memory latch $8k$ are reset, and the process just described is repeated in accordance with the revolution of the engine 3. In this way, the duration of opening of the fuel injection valve 12 or the quantity of fuel injected is determined by the output signal of the multiplier circuit $8d$ or the signal proportional to the amount of intake air.

While, in the embodiment described above, the oscillator circuit is connected in series with the bridge circuit to apply rectangular signals thereto, the same effects may be obtained by using any other oscillator circuit having the function of producing an a.c. waveform such as sine waveform or sawtooth waveform.

What is claimed is:

1. An intake air amount measuring system for an internal combustion engine which has an intake air passage and a throttle valve positioned therein, comprising:
   an electric heater positioned upstream of the throttle valve, for heating a part of intake air flowing through said intake passage in accordance with a direct current voltage applied thereto through a voltage detecting resistor connected in series therewith;
   a first thermally-sensitive resistor positioned between said electric heater and said throttle valve to be responsive to temperature of said part of the intake air heated by said electric heater;
   a second thermally-sensitive resistor connected in series with said first thermally-sensitive resistor and positioned upstream of said throttle valve to be responsive to temperature of the remaining part of the intake air flowing through said intake passage;
   series-connected reference resistors connected in parallel with said series-connected first and second thermally-sensitive resistors to constitute a bridge circuit therewith;
   an oscillator circuit, connected to said bridge circuit, for supplying said bridge circuit with a pulsated voltage the amplitude of which is proportional to said direct current voltage supplied thereto;
   a heat control circuit, connected to said bridge circuit, for supplying said electric heater and said oscillator circuit with said direct current voltage which varies to maintain a voltage difference between a voltage at a junction point of said first and second thermally-sensitive resistors and a voltage at a junction point of said series-connected reference resistors to be constant; and
   computation means, connected to said electric heater, for computing an amount of the intake air in response to the direct current voltages across said electric heater and across said voltage detecting resistor.

2. An intake air amount measuring system according to claim 1, further comprising:
   a first air passage, positioned in said intake passage, in whih said electric heater and said first thermally-sensitive resistor are positioned; and
   a second air passage, positioned in said intake passage parallelly with said first air passage, in which said second thermally-sensitive resistor is positioned.

3. An intake air amount measuring system according to claim 2, wherein said heat control circuit includes:
   an alternating current output differential amplifier, connected to said bridge circuit, for generating an alternating current output voltage which is proportional to the voltage difference between the voltages at said junction points;
   a rectifier circuit, connected to said alternating current output differential amplifier, for rectifying said alternating current output voltage; and
   an integration circuit, connected to said rectifier circuit, for integrating an output voltage of said rectifier circuit to generate said direct current voltage which is supplied to said electric heater and said oscillator circuit.

4. An intake air amount measuring system according to claim 3, wherein said computation means includes:
   a first converter for converting the direct current voltage across said electric heater into a first digital signal;
   a second converter for converting the direct current voltage across said voltage detecting resistor into a second digital signal; and
   a digital multiplier, connected to said first and second converters, for multiplying said first and second digital signals to generate an electric signal indicative of said intake air amount.

5. An intake air amount measuring system according to claim 1, wherein said heat control circuit includes:
   an alternating current output differential amplifier, connected to said bridge circuit, for generating an alternating current output voltage which is proportional to the voltage difference between the voltages at said junction points;
   a rectifier circuit, connected to said alternating current output differential amplifier, for rectifying said alternating current output voltage; and
   an integration circuit, connected to said rectifier circuit, for integrating an output voltage of said rectifier circuit to generate said direct current voltage which is supplied to said electric heater and said oscillator circuit.

6. An intake air amount measuring system according to claim 5, wherein said computation means includes:
   a first converter for converting the direct current voltage across said electric heater into a first digital signal;
   a second converter for converting the direct current voltage across said voltage detecting resistor into a second digital signal; and
   a digital multiplier, connected to said first and second converters, for multiplying said first and second digital signals to generate an electric signal indicative of said intake air amount.

7. An intake air amount measuring system according to claim 1, wherein said computation means includes:
   a first converter for converting the direct current voltage across said electric heater into a first digital signal;
   a second converter for converting the direct current voltage across said voltage detecting resistor into a second digital signal; and
   a digital multiplier, connected to said first and second converters, for multiplying said first and second digital signals to generate an electric signal indicative of said intake air amount.

* * * * *